United States Patent [19]
Lee

[11] 3,868,024
[45] Feb. 25, 1975

[54] APPARATUS FOR MOVING AND ROTATING LONG WORKPIECES SUCH AS STRUCTURAL STEEL

[76] Inventor: Jack C. Lee, 940 Orange Grove Ave., Arcadia, Calif. 91006

[22] Filed: Feb. 22, 1974

[21] Appl. No.: 444,717

[52] U.S. Cl............................ 214/1 QC, 198/20 R
[51] Int. Cl.............................................. B65g 47/32
[58] Field of Search..... 214/1 QC, 1 QG; 198/20 R, 198/105, 257, 266, 278

[56] References Cited
UNITED STATES PATENTS
2,338,285  1/1944  Harry .............................. 214/1 QC
3,269,564  8/1966  Doherty ......................... 214/1 QC

*Primary Examiner*—Albert I. Makay
*Assistant Examiner*—James W. Jones
*Attorney, Agent, or Firm*—Sellers and Brace

[57] ABSTRACT

Apparatus for moving and rotating long workpieces such as structural steel and the like while undergoing processing and fabricating operations. In a typical installation a power conveyor serving a steel processing station is equipped along its sides with pairs of extendable brackets supporting the upper run of separate link belts connected to reversible drive motors. When the brackets are extended the upper run of the belts lift the workpiece off the conveyor and are then drivable to rotate the workpiece about its axis. If the brackets are pivoted away from one another, the workpiece is elevated off the conveyor and the belts are effective to shift the workpiece laterally to any position including onto and off either side of the conveyor. Double range hydraulic cylinders are selectively effective to pivot as well as to extend and retract the belt supporting brackets.

24 Claims, 7 Drawing Figures

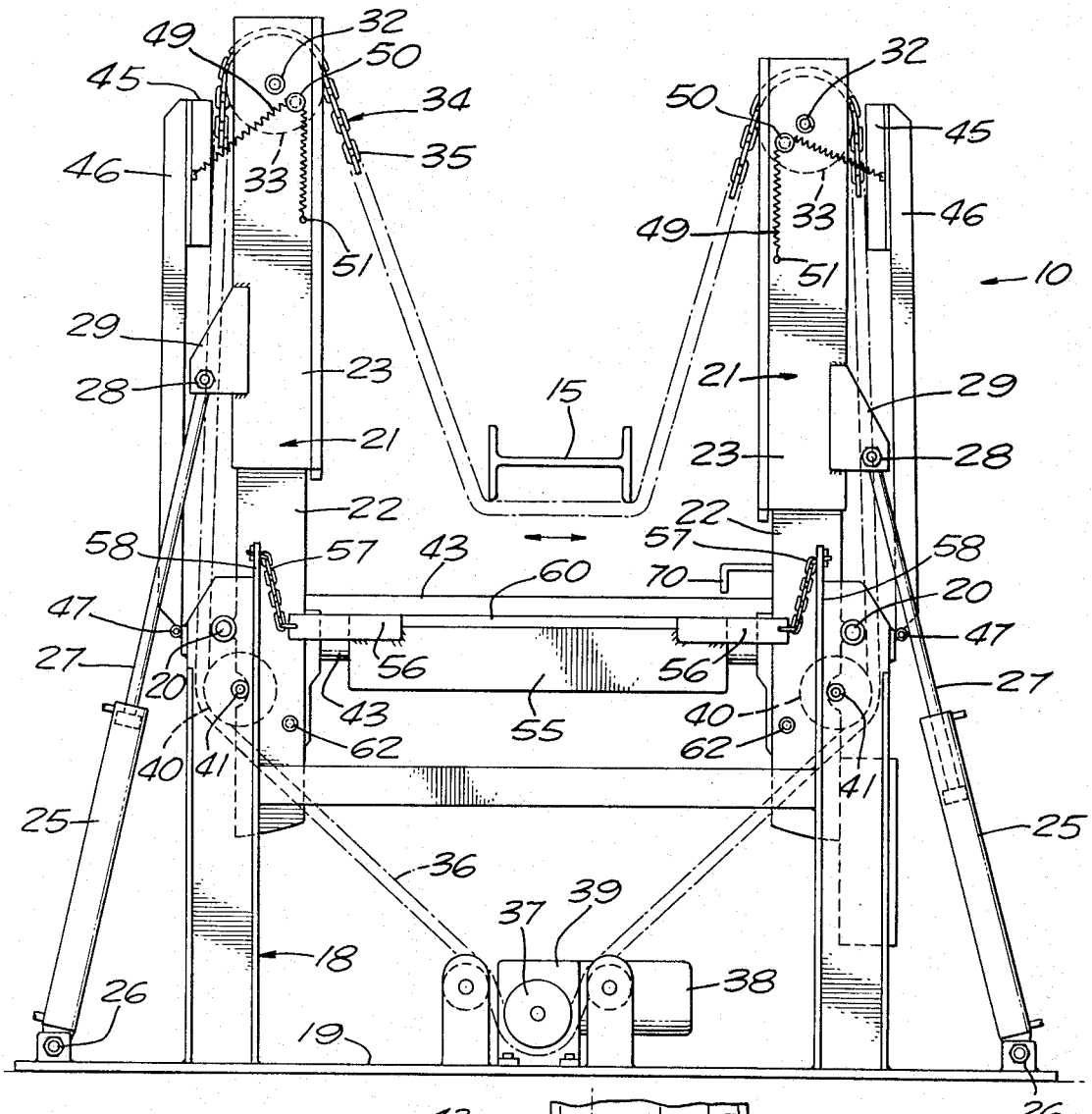

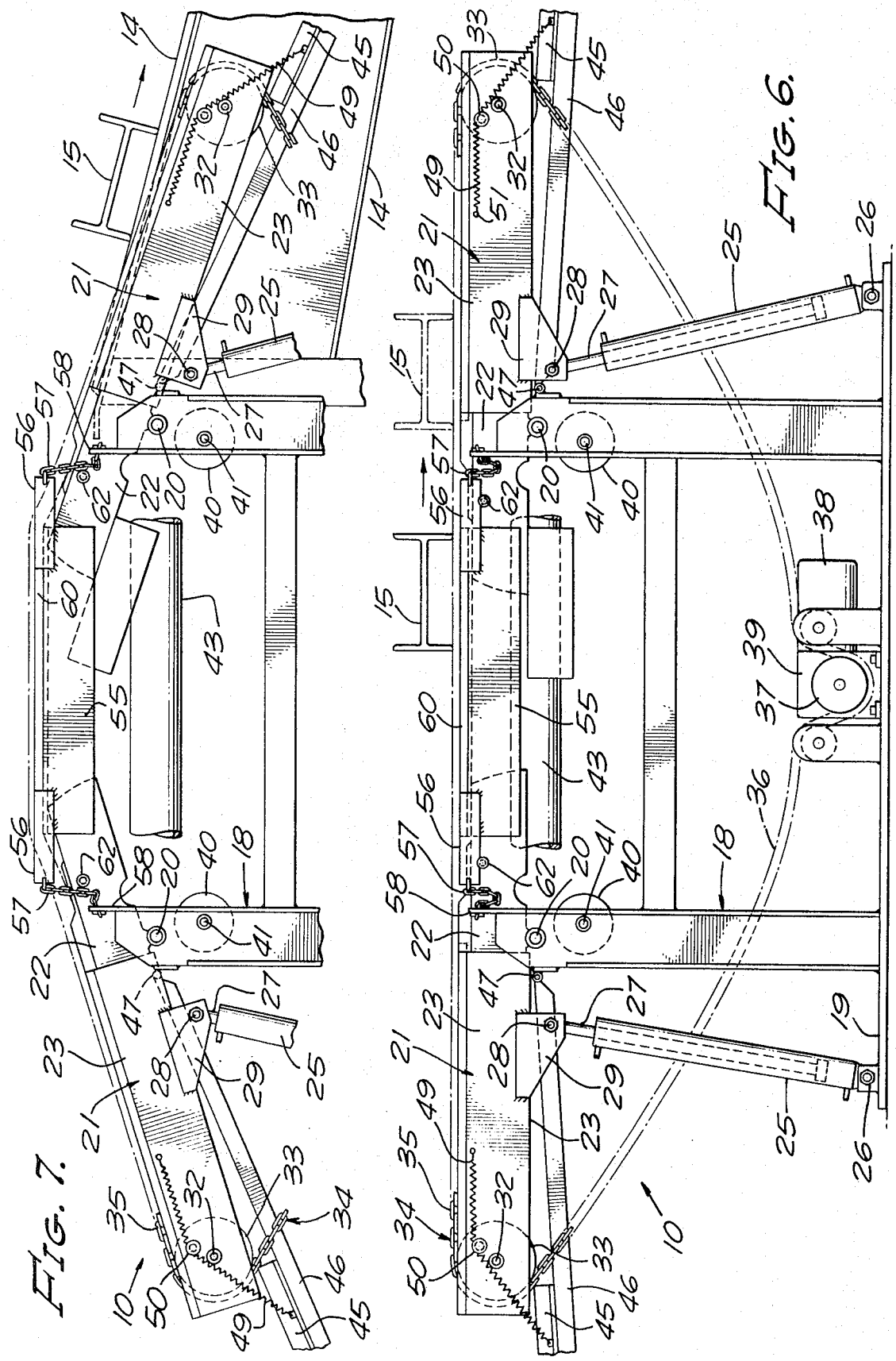

APPARATUS FOR MOVING AND ROTATING LONG WORKPIECES SUCH AS STRUCTURAL STEEL

This invention relates to workpiece handling and rotating apparatus, and more particularly to improved unique means installable at spaced points along a conveyor and operable to lift heavy material off the conveyor and then rotate and/or shift it to a new position before redeposit onto the conveyor.

Certain processing and fabricating operations have need for handling, shifting and rotating long, heavy workpieces, and typically timber and structural steel while undergoing processing. For many years these operations were commonly performed by overhead traveling crane or hoist equipment. Such equipment is not only bulky and costly but requires one or more additional workmen and interferes seriously with the use of such equipment for other operations between stages of the workpiece processing procedure. In an effort to avoid these serious disadvantages proposals have been made to provide work handling equipment supported at or near ground level having power means to lift and rotate the workpiece but each of these prior proposals is subject to serious shortcomings and disadvantages avoided by the present invention. A number of these proposals involve the use of flexible belt means of either loop or non-loop configuration along with power means utilizing the belt to lift and rotate the workpiece to a different position. One type utilizing a pair of closed loop link belts requires threading the workpiece through these belts while suspended from overhead hoisting equipment to lift the workpiece by the belts in order to rotate it. In addition to the obvious disadvantages inherent in the required threading operation, such equipment seriously interferes with loading and unloading the conveyor laterally of the workpiece rotating station. Other workpiece rotating proposals utilizing closed loop belts arranged to support the workpiece on the upper run of the belts require rigid supporting brackets extending upwardly from either side of the workpiece conveyor. These rigid supporting brackets necessitate the use of special material handling equipment or render it impractical to load and unload the conveyor laterally from its side in the area of the workpiece rotating station.

The foregoing and other serious shortcomings of prior efforts to provide improved workpiece handling and rotating equipment are avoided by the present invention. Typically, the invention employs a pair of simply constructed auxiliaries installable at spaced apart points along power conveyor means. Each of these similar auxiliaries includes a pair of retractable and extendable brackets pivotable toward and away from one another about axes near their lower ends and spaced to either side of the conveyor. A closed loop link belt for each auxiliary has its upper run supported on sprockets at the upper end of its two brackets and its lower run connected to reversible drive means. Normally, the brackets are retracted and the upper run of each link belt is draped in a U-configuration crosswise of the conveyor with the bight portion lying below the support surface of the conveyor, thereby permitting the conveyor to be used in conventional manner without interference from the link belt.

Double range, double action operating cylinders for the brackets are effective through a first range of movement to extend and retract the brackets and effective in a second range of movement to pivot the brackets between upright and horizontal or downwardly inclined positions. When the brackets are extended or pivoted away from one another, the workpiece is elevated off the conveyor and the link belts are then selectively usable to rotate the workpiece or to shift it laterally in either direction. Pressure pad means bearing against the link belts opposite the remote sides of the sprocket wheels function automatically during retraction of the brackets to lengthen the portion of the upper run of the link belts between a related pair of sprockets. This assures that the upper run of the link belts will be sufficiently long to lie draped along the vertical edges of the brackets and below the workpiece supporting surface of the conveyor.

After the processing of a particular workpiece has been completed, the invention handling equipment can be employed to lift the finished piece off the conveyor and to then shift it laterally off the conveyor to a place of deposit without need for the use of overhead crane or other handling equipment. All operations are controllable by a single operator stationed at a control console.

Accordingly, it is a primary object of the invention to provide improved, highly versatile apparatus for handling, moving and rotating long heavy workpieces.

Another object of the invention is the provision of simply constructed powered auxiliaries installable at spaced points along a conveyor and operable to lift, shift and rotate a workpiece relative to the conveyor without need for overhead hoist equipment and without interfering with the loading or unloading of the conveyor from either side thereof and at any point therealong.

Another object of the invention is the provision of pairs of closed loop belts supported in vertical planes crosswise of a workpiece conveyor on bracket means pivotable toward and away from one another in a manner utilizing the upper run of the belts to rotate a workpiece or to shift it laterally of the conveyor.

Another object of the invention is the provision of workpiece handling and rotating equipment equipped with extendable and contractable link belt supporting brackets and provided with double-action double-range hydraulic cylinders selectively operable to extend and retract the brackets and to pivot the same toward and away from one another depending upon which of numerous workpiece handling operations is desired.

These and other more specific objects will appear upon reading the following specification and claims and upon considering in connection therewith the attached drawing to which they relate.

Referring now to the drawing in which a preferred embodiment of the invention is illustrated:

FIG. 1 is a general diagrammatic view of workpiece processing equipment served by roller conveyor means and showing an illustrative disposition of the invention work handling equipment installed therealong;

FIG. 2 is a side elevational view taken along line 2—2 on FIG. 1 showing one of the two similar workpiece handling devices with the parts disposed for supporting the workpiece directly on the conveyor;

FIG. 3 is a fragmentary top plan view on an enlarged scale taken along line 3—3 on FIG. 5;

FIG. 4 is a fragmentary cross-sectional view on an enlarged scale taken along line 4—4 on FIG. 2;

FIG. 5 is a view similar to FIG. 2 but showing the belt supporting brackets in extended position with the upper run of the belt supporting a workpiece above the conveyor rollers;

Figures 1, 2:
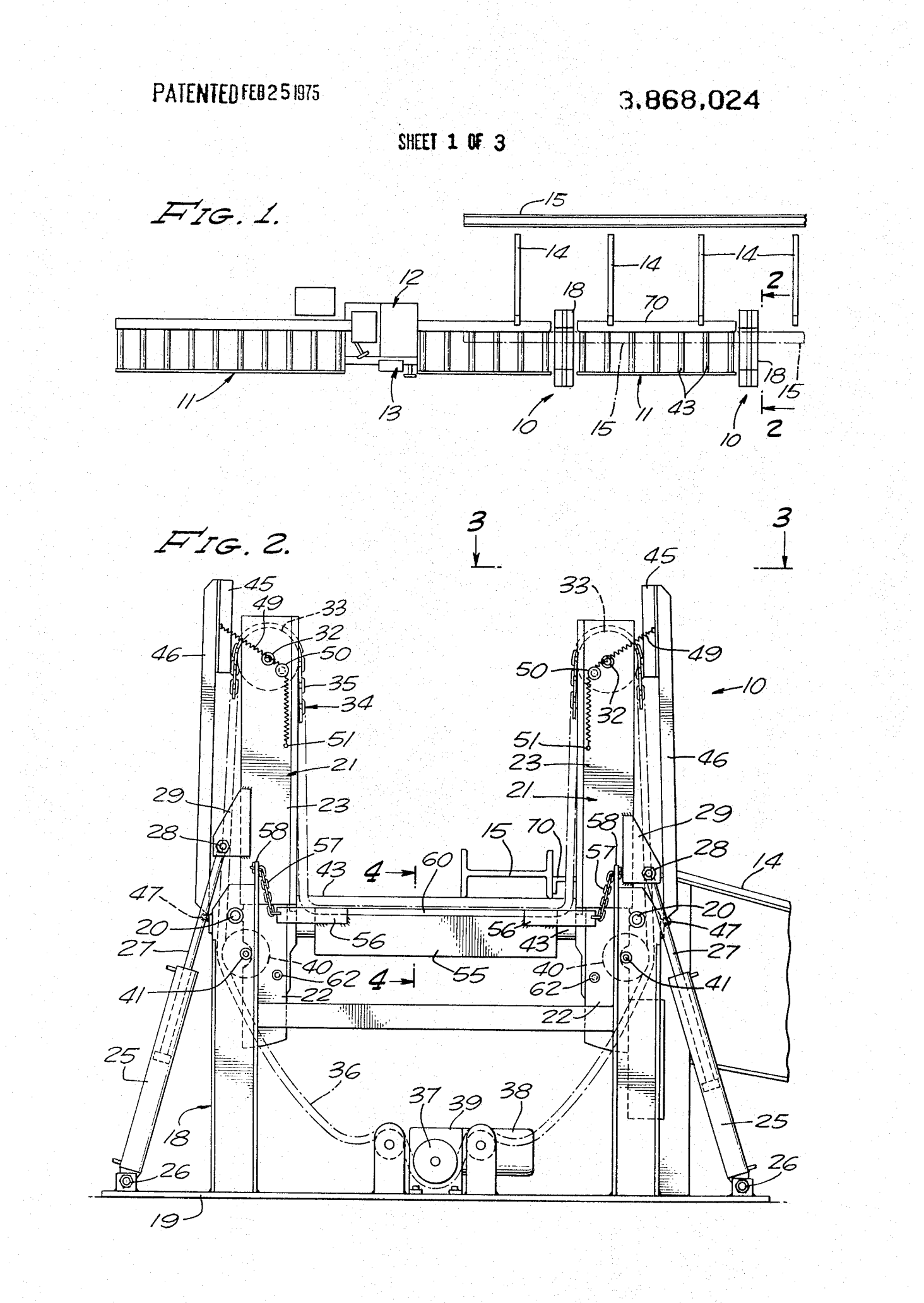

FIG. 6 is a cross-sectional elevational view similar to FIG. 2 but showing the belt supporting brackets pivoted to an outstretched horizontal position and in readiness to shift an elevated workpiece laterally; and FIG. 7 is a view similar to FIG. 6 but showing the brackets inclined downwardly below the horizontal position and with a workpiece in transfer movement from the right side of the conveyor onto a receiving slideway for the workpiece.

Referring initially more particularly to FIG. 1, there is shown a material processing assembly for processing structural steel equipped with a pair of the invention workpiece handling devices, designated generally 10, installed at spaced apart points along a power driven roller conveyor 11. Intermediate the opposite ends of this conveyor is any suitable workpiece processing equipment such as a heavy duty punching machine 12 provided with a control console 13 equipped in known manner with a plurality of control buttons, not shown, or the like for controlling all operations by a single operator stationed at this console. It will be understood that conveyor 11 extends for any required distance to either side of the processing equipment 12. Located to either or both lateral sides of the workpiece handling devices 10, 10 are a plurality of downwardly inclined slide rails 14, 14 along which a finished workpiece, such as the I-beam 15, gravitates to a point of deposit after the punching or other fabricating operations have been completed.

Referring now more particularly to FIG. 2, there is shown one of the two similar workpiece handling accessories 10 having a main supporting frame 18 of any suitable construction including a base plate 19 attached to the conveyor frame or resting on the floor therebeneath. This main frame projects beyond either lateral side of the conveyor. Pivotally supported on frame 18 by pivot pins 20 are a pair of long brackets designated generally 21. As is best shown in FIG. 5, each of the brackets 21 includes a longer inner tubular member 22 here shown as rectangular in cross-section and a shorter tubular member 23 having a loose sliding fit lengthwise of inner member 22.

The means for extending and retracting the telescopically assembled members 22 and 23 comprises a double-action hydraulic cylinder 25 having its lower end pivotally connected at 26 to base plate 19 (FIG. 2) and the upper end of its piston rod 27 pivotally connected at 28 to brackets 29 welded or otherwise secured to bracket member 23. It will be observed from FIG. 2 that when the cylinder piston is generally midway between the ends of cylinder 25, brackets 21 are retracted and supported in a generally upright position. When the cylinder pistons are fully extended upwardly, as the left hand one is in FIG. 5, then the left hand bracket is fully extended. However, the right hand one of the cylinders 25 in FIG. 5 is only partially extended upwardly with the result that the right hand one of brackets 21 is only partially extended and it will be apparent that this differential mode of operation can be availed of advantageously. It will also be recognized that this first range movement of cylinders 25 operates to extend and retract the brackets. Presently, it will become apparent that during a second range of movement the pistons along the lower halves of cylinders 25 are effective to pivot the fully retracted brackets 21 about the axes of their respective pivot pins 20.

The link belt means and the components associated therewith will now be described with particular reference to FIGS. 2-5. Journalled on pins 32 at the upper ends of bracket members 23 are suitable idlers such as sprocket wheels 33 or the like appropriately contoured to seat and positively engage the links of a link belt or chain 34. The upper run 35 of belt 34 is the portion extending between sprockets 33, 33 whereas its lower run 36 has a positive driving connection with a sprocket 37 driven by a reversible hydraulic motor 38 through suitable speed reducer means 39. The lower run 36 of the belt passes over idlers 40 journalled to main frame 18 on pivot pins 41. As will be recognized, the operation of motor 38 in one direction serves to drive belt 34 in one direction whereas the operation of the motor in the opposite direction reverses the direction of movement of the belt.

It is highly desirable that the upper run 35 of belt 34 have an adequate length when in its relaxed non-operating position to lie in a U-shaped configuration with its legs lying vertically closely beside the edge of the adjacent brackets 21, as shown in FIG. 2, and with the bight portion of the upper run lying in a horizontal plane below the supporting surface of conveyor rollers 43. Unless a suitable expedient is employed, it will be apparent that the greater length and weight of the lower run 36 of the belt could shorten the length of the upper run 35 and avoid having the upper run always beneath the workpiece.

To avoid this result there is provided a pressure pad 45 supported on an arm 46 pivoted to main frame 18 on a pivot pin 47. Pressure pad 45 is held biased by a tension spring 49 so as to maintain belt 34 pressed firmly against the outer side of sprocket 33. It will be understood that spring 49 has one end connected to arm 46 and the other end passing over a pin 50 secured to bracket member 23 and its other end anchored to this bracket member at 51 (FIG. 2). So long as a workpiece is supported by the link belt there is no opportunity for the upper run 35 to shorten. However, if no load is present and if for any reason bracket members 23 are extended, the lower run of the link belts could lengthen to the detriment of the upper run and this is particularly true while the brackets are being retracted. However, pressure pads 45 prevent this by pressing inwardly against sprockets 33 from their remote edges as members 23 are being retracted, thereby automatically causing sprockets 33 to rotate toward one another while at the same time lengthening the portion of the upper run 35 of the belt positioned between the sprockets. In consequence, when members 23 reach their fully retracted position, as shown in FIG. 2, the upper run 35 of the belts occupies the position there indicated in dot and dash line.

A strong rigid support for the mid-length of the upper run 35 of the link belt while in use to move workpieces crosswise of the conveyor will now be described with reference to FIGS. 3-7. This support comprises an inverted channel-shaped structural member 55 extending crosswise of the conveyor with its upper side normally spaced below the upper surfaces of conveyor rollers 43. As shown, member 55 is somewhat shorter than rollers 43 and is provided with bracket extensions 56 at its opposite ends to which suspension chains 57 are connected. An upper link of these suspension chains is seated in a notch formed in a bracket 58 secured to main frame 18. The upper side of member 55 is provided with a pair of parallel guide rails 60, 60 having a height substantially less than the thickness of chain belt 34 and spaced apart to provide a seating groove for this belt. Accordingly, a portion of the belt links protrude above the upper surface of guide rails 60 to engage a workpiece and propel the same along the rails when the belt is being used to transfer a workpiece laterally of the conveyor.

Normally the rigid support member 55 is supported as shown in FIGS. 2 and 5 below the upper surface of conveyor rollers 43. However, when the link belts are being used to shift the workpiece laterally of the conveyor, member 55 is elevated to a horizontal position substantially above the upper surface of rollers 43. This is accomplished automatically as the brackets 21 are pivoted away from one another and approach the position shown in FIG. 6. Thus it will be noted that the lower ends of bracket members 22 are provided with outwardly extending pins 62 which engage brackets 56 as the brackets 21 are pivoted outwardly to a horizontal position thereby elevating member 55. Thus, in the horizontal position of the brackets shown in FIG. 6, all portions of the upper run 35 of the link belt are rigidly supported in a horizontal plane with workpiece 15 resting on guide rails 60, 60 or partially on the belt and the rails and out of contact with conveyor rollers 43.

If brackets 21 are pivoted still further until their outer ends are inclined outwardly and downwardly to the position shown in FIG. 7, then the adjacent ends of the bracket members engage the interior bottom portion of member 55 to elevate this member to a somewhat higher elevation shown in FIG. 7. The upper run 35 of the belts are then effective to shift workpiece 15 outwardly onto the downwardly inclined guide rails 14, 14 along which the workpiece gravitates to a point of deposit such as that indicated in FIG. 1.

During the pivoting of brackets 21 between their upright positions and the positions shown in FIGS. 6 and 7, the pistons of cylinders 25 are operating along their lower or second range of movement. Thus it will be observed from FIG. 6 that when the brackets are in a horizontal position the pistons of these cylinders are close to the lower ends of the cylinders whereas in their maximum pivoted position of FIG. 6 the piston is at or close to the lowermost ends of these cylinders.

The operation of the work handling and rotating equipment will be readily understood from the foregoing detailed description of its principal components and their functional relationships to one another. According to one preferred mode of use, a workpiece, such as the I-beam 15, is supported on conveyor 11 to the right of the processing equipment 12. At this time, brackets 21 will be in the upright position shown in FIG. 2 and the workpiece will be pressed against the positioning stop 70 (FIG. 2). An operator stationed at console 13 then manipulates the controls thereof in known manner to drive the conveyor rollers 43 and advance the workpiece into proper processing position relative to equipment 12. He then proceeds to complete those operations performable with member 15 in its initial position.

If the operator then wishes to perform further operations with member 15 rotated to a different position, he utilizes conveyor 11 to retract the workpiece to an appropriate position relative to the handling devices 10, 10. He next punches the appropriate controls of console 13 to extend the pistons of cylinders 25 and the bracket members 23, 23 upwardly to the position shown in FIG. 5, thereby lifting member 15 clear of rollers 43. While in this position, the belt driving motor 38 can be energized in the proper direction to rotate belt 34 clockwise or counterclockwise until member 15 is in the desired new position. Motor 38 is then stopped and cylinders 25 are retracted to lower member 15 back onto conveyor rollers 43. Any suitable conventional means may then be employed if necessary to shift the beam 15 against stop 70.

The foregoing operations are repeated as often as necessary to complete all processing operations on the workpiece.

This having been done, devices 10, 10 are utilized to shift the workpiece off on to the receiving guide rails 14, 14 (FIG. 1). This is accomplished by retracting the piston of cylinders 25 through its lower range of movement thereby pivoting the fully retracted brackets 21, 21 away from one another to the downwardly inclined position shown in FIG. 7. As this operation is in progress, the lower ends of bracket members 22 engage the rigid support member 55 in the manner described in detail above to support the upper run of belt 34 firmly in engagement with the workpiece while motor 38 is driving the belts in synchronism in a direction to shift the workpiece laterally onto guide rails 14. Thereafter and during the return of the brackets to their upright position, pressure pads 45 hold the sprockets 33 stationary thereby assuring that the relaxed upper run of each belt will lie as shown in FIG. 2 as the brackets are returned to their upright positions. The hydraulic and control components for the conveyor, belt drive motor and cylinders 25 are of any suitable character well known to those skilled in the control art and involve no novel features. Accordingly, the details of these components, being well known, need not be illustrated.

While the particular apparatus for moving and rotating long workpieces such as structural steel herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. Apparatus for handling and rotating long workpieces while supported generally horizontally comprising: horizontally disposed conveyor means, pairs of first and second long brackets with one bracket of each pair disposed at one side of said conveyor means and the other bracket of each pair disposed at the other side of said conveyor means, a first bracket of each pair including power means for extending and retracting the same lengthwise thereof, sprocket means journalled in the outer ends of said brackets, endless belt means for each of said pairs of brackets with the upper runs thereof draped over an associated pair of said sprocket means and the lower runs thereof operatively connected to reversible drive means for driving each of said belt means in unison in either direction, said upper belt runs being relaxed to a position below and out of contact with a workpiece resting on said conveyor means when at least said first brackets of each pair thereof are retracted, and said upper belt runs being effective to lift and support a workpiece clear of said conveyor means for rotation of the workpiece about its longitudinal axis by said reversible drive means when said first bracket of each pair thereof is in an extended position.

2. Apparatus as defined in claim 1 characterized in that said first brackets are pivoted near the lower end thereof to one side of said conveyor means for pivotal movement in a vertical plane extending crosswise of said conveyor means.

3. Apparatus as defined in claim 2 characterized in that said first brackets are pivotable through an arc including a generally upright position and a generally horizontal position outwardly of the side of said conveyor means.

4. Apparatus as defined in claim 3 characterized in that said power operated means for extending and retracting said first bracket of each pair includes means operable to pivot said first bracket in a vertical plane extending crosswise of said conveyor means.

5. Apparatus as defined in claim 1 characterized in that the lower portions of each of said brackets is movably connected to the adjacent side of said conveyor means with the brackets of each pair being movable in a vertical plane toward and away from one another.

6. Apparatus as defined in claim 4 characterized in that each of said first and second brackets includes power operated means for extending and retracting the same lengthwise thereof.

7. Apparatus as defined in claim 6 characterized in the provision of means for rotating said sprocket means toward one another as said brackets are being retracted thereby to increase the length of the upper run of said belt means located between said sprocket means.

8. Apparatus as defined in claim 6 characterized in the provision of pressure pad means effective to hold said belt means pressed against said sprocket means in a plane generally parallel to the longitudinal axis of said brackets and effective to rotate said sprocket means toward one another during retraction of said brackets thereby to increase the length of the upper run of said belt means located between said sprocket means.

9. Apparatus as defined in claim 6 characterized in that said power operated means comprises a separate double action cylinder for each of said brackets operable through first and second ranges and effective in said first range to extend and retract said brackets and effective in said second range to pivot said pairs of brackets in vertical planes.

10. Apparatus as defined in claim 9 characterized in the provision of elongated rigid means extending between the lower ends of each pair of said brackets, and means operable as said brackets are pivoted away from one another to elevate said rigid means to support the adjacent portion of the upper run of said belt means in the same general plane with the other upper run portions of said belt means.

11. Apparatus as defined in claim 10 characterized in that said double action cylinders are operable to support said first and second brackets rigidly in the generally horizontal position thereof, and said reversible belt drive means being operable to shift a workpiece laterally thereof to any position between the remote ends of said brackets.

12. Apparatus for rotating and moving a long workpiece relative to a work station comprising in combination a long power driven conveyor having a workpiece work station thereadjacent, a plurality of workpiece handling and rotating means astride said conveyor at spaced apart points therealong each comprising: a pair of elongated bracket means having the lower end portion of one bracket means pivoted to one side of said conveyor and the end portion of the other pivoted to the other side of the conveyor, slider means reciprocable along each bracket and supporting idler sprocket means at the outer end thereof, motor means operable to shift each slider means lengthwise of the associated bracket means and operable in the retracted position of said slider means to pivot said associated bracket and slider means to different positions including a generally upright position and a generally horizontal position laterally of the side of said conveyor, loop belt means having the upper run thereof trained over said idler sprocket means and beneath the workpiece support surface of said conveyor, reversible drive means operatively connected to said loop belt means to drive said belt in either direction, and said pair of workpiece handling and rotating means being selectively operable in unison with one another to lift a workpiece off said conveyor and to rotate the workpiece about the longitudinal axis thereof and to shift the same laterally of said conveyor at the option of the operator.

13. Apparatus as defined in claim 12 characterized in that said loop belt means comprises interlooped rings adjacent ones of which lie in planes generally at right angles to one another.

14. Apparatus as defined in claim 12 characterized in the provision of pressure means operatively associated with said idler sprocket means and effective to rotate said sprocket means in a predetermined direction during retraction of said bracket means.

15. Apparatus as defined in claim 12 characterized in that the upper runs of said loop belt means normally lie retracted and out of contact with a workpiece supported on said conveyor means in the retracted position of said slider means thereby permitting a workpiece supported on said conveyor means to be moved in any direction without interference from said belt means.

16. Apparatus as defined in claim 12 characterized in that said workpiece rotating and handling means is operable when said slider means are extended and said bracket means are pivoted outwardly away from one another to shift the workpiece crosswise of said conveyor means in either direction.

17. Apparatus as defined in claim 12 characterized in that said workpiece rotating and handling means is selectively operable when said slider means are extended and said bracket means are pivoted outwardly away from one another to transfer a workpiece laterally of itself and crosswise of said conveyor means to any position between the remotely spaced ends of said slider means.

18. Apparatus as defined in claim 12 characterized in that said loop belt means comprises an endless chain under tension when in use to support a workpiece above said conveyor means and the upper run of which is slack when not supporting a workpiece and draped in a U-shaped configuration with the legs thereof lying closely against the side of the adjacent one of said slider means and with the bight portion thereof spaced below the workpiece supporting surface of said conveyor means.

19. Apparatus as defined in claim 18 characterized in the provision of horizontally disposed elongated rigid support means for the bight portion of the slackened upper run of said belt means, and means for elevating said support means as said bracket means are pivoted outwardly away from one another whereby said bracket and slider means cooperate with said support means to provide a generally continuous support for the upper run of said belt means while the latter is in use to support a workpiece above said conveyor means and to shift the workpiece crosswise of said conveyor means.

20. Apparatus as defined in claim 12 characterized in that said motor means for shifting said slider means lengthwise of the associated bracket means comprises separate double action hydraulic cylinders.

21. Apparatus as defined in claim 20 characterized in that said hydraulic cylinders are operable through first and second ranges of movement in the first of which said cylinders are operable to move said slider means between extended and retracted positions while holding said bracket means against pivoting and in the second of which range of movement said cylinders are operable to pivot said bracket means.

22. Apparatus as defined in claim 21 characterized in that said cylinders are located along either outer side of said conveyor means with their axes inclined toward one another and with their upper ends movably connected to a respective one of said slider means at a point above the pivot axis between said conveyor and a respective one of said bracket means.

23. An article of manufacture usable in pairs to lift, rotate and shift a long workpiece laterally of itself comprising: a rigid frame, extendable and retractable bracket means mounted adjacent the upper lateral sides thereof, each of said bracket means normally being in a generally upright position and the lower end of at least one thereof being pivoted to said main frame for movement in a vertical plane toward and away from the other of said bracket means, idler pulley means, journalled to the upper ends of said brackets and supporting the upper run of a loop belt, reversible motor means operably connected to the lower run of said loop belt, and power means for extending, retracting and pivoting said pivotally supported bracket means thereby to lift, shift and rotate one end of a workpiece when supported on the upper run of said loop belt.

24. An article of manufacture as defined in claim 23 characterized in that the lower end of each of said bracket means is pivotally connected to a respective adjacent side of said main frame.

* * * * *